(12) United States Patent
Bhavaraju et al.

(10) Patent No.: US 9,206,515 B2
(45) Date of Patent: Dec. 8, 2015

(54) METHOD OF PRODUCING COUPLED RADICAL PRODUCTS VIA DESULFOXYLATION

(71) Applicant: Ceramatec, Inc., Salt Lake City, UT (US)

(72) Inventors: Sai Bhavaraju, West Jordan, UT (US); Justin Pendleton, Salt Lake City, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 0 days.

(21) Appl. No.: 14/198,026

(22) Filed: Mar. 5, 2014

(65) Prior Publication Data

US 2014/0183053 A1    Jul. 3, 2014

Related U.S. Application Data

(63) Continuation-in-part of application No. 12/840,508, filed on Jul. 21, 2010, now Pat. No. 8,506,789, and a continuation-in-part of application No. 12/840,401, filed on Jul. 21, 2010, and a continuation-in-part of (Continued)

(51) Int. Cl.
  *C25B 3/00* (2006.01)
  *C25B 3/10* (2006.01)

(Continued)

(52) U.S. Cl.
  CPC ... *C25B 1/02* (2013.01); *C10G 3/40* (2013.01); *C10G 3/45* (2013.01); *C10G 3/47* (2013.01); *C10G 3/50* (2013.01); *C10G 32/02* (2013.01);

(Continued)

(58) Field of Classification Search
  CPC .................................... C25B 3/10; C25B 3/00
  USPC ......................................................... 205/462
  See application file for complete search history.

(56) References Cited

U.S. PATENT DOCUMENTS 2,760,926 A    8/1956    Kronenthal
2,867,569 A    1/1959    Kronenthal (Continued)

FOREIGN PATENT DOCUMENTS

CN    101089231 A    12/2007
CN    101336313 A    12/2008

(Continued)

OTHER PUBLICATIONS

Palit, Santi R., "The Solubility of Soaps and of Some Salts in Mixtures of Solvents, One of Which Is of Glycolic Type", *Utah Consortia UALC*, vol. 69, (Dec. 1947),3120-29.

(Continued)

*Primary Examiner* — Edna Wong
(74) *Attorney, Agent, or Firm* — David Fonda

(57) ABSTRACT

A method that produces coupled radical products. The method involves obtaining a sodium salt of a sulfonic acid ($R$—$SO_3$—$Na$). The alkali metal salt is then used in an anolyte as part of an electrolytic cell. The electrolytic cell may include an alkali ion conducting membrane (such as a NaSICON membrane). When the cell is operated, the alkali metal salt of the sulfonic acid desulfoxylates and forms radicals. Such radicals are then bonded to other radicals, thereby producing a coupled radical product such as a hydrocarbon. The produced hydrocarbon may be, for example, saturated, unsaturated, branched, or unbranched, depending upon the starting material.

9 Claims, 4 Drawing Sheets

Related U.S. Application Data application No. 12/840,913, filed on Jul. 21, 2010, now Pat. No. 8,647,492, and a continuation-in-part of application No. 13/612,192, filed on Sep. 12, 2012.

(60) Provisional application No. 61/773,610, filed on Mar. 6, 2013, provisional application No. 61/228,078, filed on Jul. 23, 2009, provisional application No. 61/258,557, filed on Nov. 5, 2009, provisional application No. 61/260,961, filed on Nov. 13, 2009.

(51) Int. Cl.
*C25B 1/02* (2006.01)
*C25B 3/02* (2006.01)
*C10G 3/00* (2006.01)
*C25B 9/08* (2006.01)
*C10G 32/02* (2006.01)

(52) U.S. Cl.
CPC ... *C25B 3/02* (2013.01); *C25B 3/10* (2013.01); *C25B 9/08* (2013.01); *C10G 2300/1014* (2013.01); *C10G 2300/1018* (2013.01); *C10G 2300/44* (2013.01); *C10G 2400/04* (2013.01)

(56) References Cited

U.S. PATENT DOCUMENTS

| | | | |
|---|---|---|---|
| 3,193,479 A * | 7/1965 | Baizer | 205/433 |
| 3,249,521 A * | 5/1966 | Baizer | 205/415 |
| 3,885,626 A | 5/1975 | Gale et al. | |
| 3,992,471 A | 11/1976 | Priegnitz | |
| 4,006,065 A | 2/1977 | Meresz et al. | |
| 4,123,336 A | 10/1978 | Seko et al. | |
| 4,402,804 A | 9/1983 | Jackson | |
| 4,464,236 A | 8/1984 | Noding | |
| 5,084,146 A | 1/1992 | Huang | |
| 5,290,404 A | 3/1994 | Toomey | |
| 5,290,405 A | 3/1994 | Joshi et al. | |
| 5,580,430 A | 12/1996 | Balagopal et al. | |
| 5,633,400 A | 5/1997 | Wagner et al. | |
| 5,841,002 A | 11/1998 | Harrison et al. | |
| 5,892,107 A | 4/1999 | Farone et al. | |
| 6,193,872 B1 | 2/2001 | Reason et al. | |
| 6,238,543 B1 | 5/2001 | Law et al. | |
| 6,362,380 B1 | 3/2002 | Eicken et al. | |
| 6,392,091 B2 | 5/2002 | Lin | |
| 8,506,789 B2 | 8/2013 | Bhavaraju et al. | |
| 2001/0019020 A1 | 9/2001 | Merk et al. | |
| 2005/0177008 A1 | 8/2005 | Balagopal et al. | |
| 2008/0177114 A1 | 7/2008 | Goossen et al. | |
| 2008/0245671 A1 | 10/2008 | Balagopal et al. | |
| 2009/0074611 A1 | 3/2009 | Monzyk et al. | |
| 2009/0305942 A1 | 12/2009 | Day et al. | |
| 2010/0159553 A1 | 6/2010 | Bradin | |
| 2010/0258447 A1 | 10/2010 | Fan | |
| 2010/0331170 A1 | 12/2010 | Balagopal et al. | |
| 2011/0024288 A1 | 2/2011 | Bhavaraju et al. | |
| 2011/0027848 A1 | 2/2011 | Karanjikar et al. | |
| 2011/0035995 A1 | 2/2011 | Busch | |
| 2011/0111475 A1 | 5/2011 | Kuhry et al. | |
| 2011/0168569 A1 | 7/2011 | Bhavaraju et al. | |
| 2011/0226633 A1 | 9/2011 | Bhavaraju et al. | |
| 2011/0240484 A1 | 10/2011 | Pendleton et al. | |
| 2012/0031769 A1 | 2/2012 | Bhavaraju et al. | |
| 2012/0035403 A1 | 2/2012 | Flytzani-Stephanopoulos et al. | |
| 2012/0103529 A1 | 5/2012 | Bhavaraju et al. | |
| 2012/0123168 A1 | 5/2012 | Bhavaraju | |
| 2012/0142945 A1 | 6/2012 | Hwang et al. | |
| 2012/0316093 A1 | 12/2012 | Zhan et al. | |
| 2013/0001095 A1 | 1/2013 | Bhavaraju et al. | |
| 2013/0186770 A1 | 7/2013 | Mosby | |
| 2013/0284607 A1 | 10/2013 | Bhavaraju et al. | |
| 2014/0154766 A1 | 6/2014 | Karanjikar et al. | |

FOREIGN PATENT DOCUMENTS

| | | |
|---|---|---|
| EP | 0838435 | 4/1998 |
| GB | 787976 | 12/1957 |
| JP | 06271499 | 9/1994 |
| SU | 979325 | 12/1982 |
| WO | WO-2007/095215 | 8/2007 |

OTHER PUBLICATIONS

Park, Sang Ho "PCT International Search Report", Int. App. No. PCT/US2010/042715, (Apr. 29, 2011),1-3.
Park, Sang Ho "PCT Written Opinion", Int. App. No. PCT/US2010/042715, (Apr. 29, 2011),1-4.
Kang, Sang Yoon "PCT International Search Report", Int. App. No. PCT/US2010/042756, (Feb. 28, 2011),1-3.
Kang, Sang Yoon "PCT Written Opinion", Int. App. No. PCT/US2010/042756, (Feb. 28, 2011),1-4.
Park, Sang Ho "PCT International Search Report", Int. App. No. PCT/US2010/042780, (May 2, 2011),1-3.
Park, Sang Ho "PCT Written Opinion", Int. App. No. PCT/US2010/042780, (May 2, 2011),1-4.
Bozell, Joseph J., "Connecting Biomass and Petroleum Processing with a Chemical Bridge", *Science*, (Jul. 30, 2010),vol. 329: 522-523.
Bond, Jesse Q., et al., "Integrated Catalytic Conversion of gamma-Valerolactone of Liquid Alkenes for Transportation Fuels", *Science*, (Feb. 26, 2010),vol. 327: 1110-1114.
Chum, H L., et al., "Photoelectrochemistry of Levulinic Acid on Undoped Platinized n-TIO2 Powders", *J. Phys. Chem*, (1983),vol. 87: 3089-3093.
Schafer, Hans-Jurgen "Recent Contributions of Kolbe Electrolysis to Organic Synthesis", *Two in Current Chemistry*, (1990),vol. 152: 91-151.
Rabjohn, et al., "Kolbe Electrosynthesis of Alkanes with Multiple Quaternary Carbon Atoms", *J. Org. Chem.*, (1981),vol. 46, pp. 4082-4083.
Wong, Edna "USPTO Office Action", U.S. Appl. No. 12/840,508, (Nov. 2, 2011),17 pages.
Kobzeva, et al., "Effect of a solvent on anode processes", *Elektrokhimiya*, vol. 11. No. 5, (1975),1 page abstract.
Ono, et al., "Electrolysis of fatty acids I", *Ind. Chem. Sect. 53*, (1950),1 page abstract.
Minami, et al., "Electrolysis of Fatty Acids II", *Kogyo Kagaku Zasshi*, vol. 53, (1950),1 page abstract.
Obermuller, "Saponification by Sodium Ethoxide", *J Chem. Soc.*, Abstr. 62, (1892),1 page abstract.
Wong, Edna "USPTO Office Action", U.S. Appl. No. 12/840,913, (Nov. 16, 2011),16 pages.
Wong, Edna "Non-Final Office Action", U.S. Appl. No. 12/840,508 (Apr. 26, 2012),1-32.
Wong, Edna "Non-Final Office Action", U.S. Appl. No. 12/840,913, (Apr. 10, 2012),1-12.
Mendez, Zulmariam "Non-Final Office Action", U.S. Appl. No. 12/840,401, (Jun. 5, 2012),1-12.
Wong, Edna "Non-Final Office Action", U.S. Appl. No. 13/357,463, (Jun. 4, 2012),1-25.
Pande, et al., "Studies on Kolbe's Electrosynthesis", *Electrochimica Acta*, Aug. 1961 vol. 4,215-231.
Ho, Park S., "International Search Report", PCT US 2011/035782 (corresponding to U.S Appl. No. 13/103,716, (Feb. 9, 2012),1-3.
Ho, Park S., "Written Opinion of the International Searching Authority", PCT US 2011/035782 (corresponding to U.S. Appl. No. 13/103,716, (Feb. 9, 2012),1-4.
Ko, et al., "Computer Translation of the Detailed Description of JP 6-271499", Japanese Patent publication 06-271499, (Sep. 27, 1994),1-8.
Aslanov, N. N. "English Language Bibliographical Information and Abstract", SU Patent No. 979325, (Dec. 7, 1982),1-3.
Choi, et al., "Recovery of lactic acid from sodium lactate by ion substitution using ion-exchange membrane", *Separation and Purification Technology 28* (2002), Elsevier, (Mar. 4, 2002),69-79.
Habova, et al., "Application of Electrodialysis for Lactic Acid Recovery", *Czech J. Food Sci.*, vol. 19, No. 2 (2001), (Jan. 1, 2001),73-80.

(56) References Cited

OTHER PUBLICATIONS

Huang, et al., "Application of electrodialysis to the production of organic acids: State-of-the-art and recent developments", *Journal of Membrane Science 288* (2007), Elsevier, (Nov. 25, 2006),1-12.
Lu, et al., "Modeling of the mass transfer and conduction behavior in electro-electrodialysis with oil/water emulsion as the catholyte", *Journal of Membrane Science 322* (2008), Elsevier, (Jun. 5, 2008),265-274.
Moon, et al., "Competitive Anion Transport in Desalting Mixtures of Organic Acids by Batch Electrodialysis", *Journal of Membrane Science 141* (1998), Elsevier, (Apr. 1, 1998),75-89.
Palaty, et al., "Continuous dialysis of carboxylic acids. Permeability of Neosepta-AMH membrane", *Desalination 216* (2007), Elsevier, (Oct. 1, 2007),345-355.
Prado Rubio, et al., "Modeling Reverse Electro-Enhanced Dialysis for Integration with Lactic Acid Fermentation", *CAPEC, Department of Chemical and Biochemical Engineering Technical University of Denmark (DTU)*, DK-2800 Lyngby, Denmark, 2009, Available as "A-DK-Prado Rubio-OA-1" at Docstoc.com, http://www.docstoc.com/search/modeling%20reverse%20electro~enhanced%20dialysis%20for%20integration%20with%20lactic%20acid%20fermentation?catid=0,(Jan. 1, 2009),1-2.
Yi, et al., "An in situ coupling separation process of electro-electrodialysis with back-extraction", *Journal of Membrane Science 255* (2005), Elsevier, (Mar. 21, 2005),57-65.
Park, Sang H., "International Search Report", PCT Application No. PCT/US2011/033636 (corresponding to U.S. Appl. No. 13/092,685, (Feb. 8, 2012),1-3.
Park, Sang H., "Written Opinion of the International Searching Authority", PCT Application No. PCT/US2011/033636 (corresponding to US Appl. No. 13/092,685, (Feb. 8, 2012),1-4.
Paul, et al., "Reactions of Sodium Metal with Aromatic Hydrocarbons", *J. Am. Chem. Soc.*, 1956, 78 (1), (Jan. 1956),116-120.
Conway, et al., "New Approaches to the Study of Electrochemical Decarboxylation and the Kolbe Reaction. I. The Model Reaction with Formate", *Canadian Journal of Chemistry* (no month, 1963), vol. 41, (1963),21-37.
Wong, Edna "Final Office Action", U.S. Appl. No. 12/840,913, (Aug. 14, 2012),1-28.
Wong, Edna "Final Office Action", U.S. Appl. No. 12/840,508, (Nov. 27, 2012),1-25.
Wong, Edna "Final Office Action", U.S. Appl. No. 13/357,463, (Sep. 19, 2012),1-17.
Dzik, et al., "Carboxylates as sources of carbon nucleophiles and electrophiles: comparison of decarboxylative and decarbonylative pathways", *Chemical Science*, 2012, vol. 3, Issue No. 9 (2012), (May 3, 2012),2671-78.
Mendez, Zulmariam "Final Office Action", U.S. Appl. No. 12/840,401, (Mar. 15, 2013),1-12.
Wong, Edna "Non Final Office Action", U.S. Appl. No. 12/840,913, (Mar. 28, 2013),1-31.
Sekine, Isao et al., "Effect of the Concentration of Acetate or Propionate on the Abnormal Phenomena in the Kolbe Reaction", *Denki Kagaku*, vol. 41(9), (1973),702-707.
Wong, Edna "Non Final Office Action", U.S. Appl. No. 13/357,463, (Apr. 9, 2013),1-21.
Mendez, Zulmariam "Non Final Office Action", U.S. Appl. No. 12/840,401, (Jul. 30, 2013),1-15.
Wong, Edna "Final Office Action", U.S. Appl. No. 12/840,913, (Jul. 18, 2013),1-16.
Wong, Edna "Notice of Allowance", U.S. Appl. No. 12/840,508, (Apr. 29, 2013),1-11.
Shafer, Hans J., "Electrochemical Conversion of Fatty Acids", *European Journal of Lipid Science and Technology*, vol. 114 Issue 1 (Oct. 11, 2011),2-9.
Wong, Enda "Notice of Allowance", U.S. Appl. No. 12/840,913, (Oct. 4, 2013),1-11.
Wong, Edna "Final Office Action", U.S. Appl. No. 13/357,463, (Sep. 6, 2013),1-16.
Wong, Edna "Non-Final Office Action", U.S. Appl. No. 13/612,192, (Dec. 10, 2013),1-33.
Wong, Edna "Final Office Action", U.S. Appl. No. 13/357,463, (Jan. 3, 2014),1-14.
Stapley, et al., "English Language Abstract", CN101336313A, (Dec. 31, 2008),1.
Hongyou, et al., "English Language Abstract", CN101089231A, (Dec. 19, 2007),1.
Le, Zhikang "Chinese Office Action", Chinese Application No. 201080024541.8, (Jan. 21, 2014),1-10.
Mendez, Zulmariam "Non-Final Office Action", U.S. Appl. No. 13/790,744, (Mar. 20, 2014),1-22.
Wong, Edna "Non-Final Office Action", U.S. Appl. No. 13/612,192, (Apr. 8, 2014),1-24.
Keeling, Alexander W., "Non-Final Office Action", U.S. Appl. No. 13/092,685, (May 20, 2014),1-20.
Wong, Edna "Non-Final Office Action", U.S. Appl. No. 13/103,716, (Jun. 24, 2014),1-15.
Mendez, Zulmariam "Final Office Action", U.S. Appl. No. 12/840,401, (Mar. 13, 2014),1-19.
Kim, Su M., "International Search Report", PCT Application No. PCT/US2014/020786 (Corresponding to U.S. Appl. No. 14/198,026), (Jun. 26, 2014),1-3.
Kim, Su M., "Written Opinion of the International Searching Authority", PCT Application No. PCT/US2014/020786 (Corresponding to U.S. Appl. No. 14/198,026.), (Jun. 26, 2014),1-3.
Mendez, Zulmariam "Non-Final Office Action", U.S. Appl. No. 12/840,401, (Aug. 26, 2014),1-18.
Wong, Edna "Final Office Action", U.S. Appl. No. 13/612,192, (Aug. 15, 2014),1-18.
Wong, Edna "Non-Final Office Action", U.S. Appl. No. 13/930,211, (Jul. 23, 2014),1-43.
Klocke, et al., "Influences on the Selectivity of the Kolbe versus the Non-Kolbe Electrolyis in the Anodic Decarboxylation of Carboxylic Acids", *Electroorganic Sythesis*, (Nov. 2, 1992),1-8.
Shin, Ju C., "International Search Report", PCT Application No. PCT/US2014/028842 (Corresponding to U.S. Appl. No. 13/834,569, (Aug. 14, 2014),1-3.
Shin, Ju C., "Written Opinion of the International Searching Authority", PCT Application No. PCT/US2014/028842 (Corresponding to U.S. Appl. No. 13/834,569, (Aug. 14, 2014),1-7.
Shin, Ju C., "International Search Report", PCT/US2014/021927 (Corresponding to U.S. Appl. No. 13/790,744, (Jul. 10, 2014),1-3.
Shin, Ju C., "Written Opinion of the International Searching Authority", PCT/US2014/021927 (Corresponding to U.S. Appl. No. 13/790,744, (Jul. 10, 2014),1-7.
Wong, Edna "Non-Final Office Action", U.S. Appl. No. 13/612,192, (Dec. 5, 2014),1-37.
Glasstone, et al., "Studies in Electrolysis Oxydation Part V11. The Electrolysis of Acetates in Non-Aqueous Solutions.", *J. Chem. Soc.*, (Jan. 1, 1936),820-827.
Wong, Edna "Final Office Action", U.S. Appl. No. 13/930,211, (Nov. 21, 2014),1-32.
Wong, Edna "Final Office Action", U.S. Appl. No. 13/103,716, (Nov. 20, 2014),1-15.
Mendez, Zulmariam "Non-Final Office Action", U.S. Appl. No. 13/790,744, (Nov. 4, 2014),1-11.

* cited by examiner

METHOD OF PRODUCING COUPLED RADICAL PRODUCTS VIA DESULFOXYLATION

CROSS-REFERENCE TO PRIOR APPLICATIONS

This application claims benefit to U.S. Provisional Patent Application No. 61/773,610 filed Mar. 6, 2013. This application is also a continuation in part of U.S. patent application Ser. No. 12/840,508 filed Jul. 21, 2010 (the '508 application). The '508 application, now U.S. Pat. No. 8,506,789, claimed the benefit of U.S. Provisional Patent Application No. 61/228,078, filed on Jul. 23, 2009, U.S. Provisional Patent Application No. 61/258,557, filed on Nov. 5, 2009, and U.S. Provisional Patent Application No. 61/260,961, filed on Nov. 13, 2009. This application is also a continuation in part of U.S. patent application Ser. No. 12/840,401 filed on Jul. 21, 2010. This application is also a continuation in part of U.S. patent application Ser. No. 12/840,913, now U.S. Pat. No. 8,647,492. This application is also a continuation in part of U.S. patent application Ser. No. 13/612,192.

These provisional and non-provisional patent applications are expressly incorporated herein by reference.

BACKGROUND OF THE INVENTION

Sodium salts of alkyl sulfates are useful chemicals that are readily produced. These chemicals generally have the following structure:

One specific example of this type of chemical is Sodium dodecylbenzenesulfonate that is commonly used in detergents:

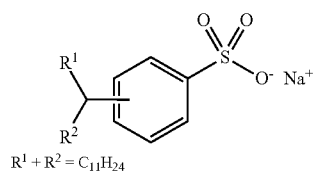

$R^1 + R^2 = C_{11}H_{24}$

Of course, any "R" group may be added to the alkyl sulfate.

Sodium salts of alkyl sulfates are commonly found in detergents, cosmetics, surfactants, shampoos, chromatography and other useful products/processes. Accordingly, these chemicals are readily available and are considered safe and biodegradable.

At the same time, there is a need for a new method by which sodium salts of alkyl sulfates may be reacted to form different, organic chemicals. Such a process is disclosed herein.

SUMMARY OF THE INVENTION

A sodium salt of an alkyl sulfonate ($[R—SO_3]^-Na^+$) will be obtained. Once obtained, this alkyl sulfonate may be incorporated into an anolyte for use in an electrolytic cell. This anolyte may also include a solvent (such as water, methanol, etc.) and optionally a supporting electrolyte (in addition to the ($[R—SO_3]^-Na^+$). For convenience, the alkyl sulfonate ($[R—SO_3]^-Na^+$ may also be shown herein as $R—SO_3—Na$.

The anolyte is fed into an electrolytic cell that uses a sodium ion conductive ceramic membrane that divides the cell into two compartments: an anolyte compartment and a catholyte compartment. A typical membrane is a NaSICON membrane. NaSICON typically has a relatively high ionic conductivity for sodium ions at room temperature. Alternatively, if the alkali metal is lithium, then a particularly well suited material that may be used to construct an embodiment of the membrane is LiSICON. Alternatively, if the alkali metal is potassium, then a particularly well suited material that may be used to construct an embodiment of the membrane is KSICON. Other examples of such solid electrolyte membranes include those based on NaSICON structure, sodium conducting glasses, beta alumina and solid polymeric sodium ion conductors. Such materials are commercially available. Moreover, such membranes are tolerant of impurities that may be in the anolyte and will not allow the impurities to mix with the catholyte. Thus, the impurities (which were derived from the biomass) do not necessarily have to be removed prior to placing the anolyte in the cell.

The electrolytic cell may use standard parallel plate electrodes, where flat plate electrodes and/or flat membranes are used. In other embodiments, the electrolytic cell may be a tubular type cell, where tubular electrodes and/or tubular membranes are used.

An electrochemically active first anode may be found in the cell and may be housed in the first anolyte compartment. The anode may be made of smooth platinum, stainless steel, or may be a carbon based electrode. Examples of carbon based electrodes include boron doped diamond, glassy carbon, synthetic carbon, Dimensionally Stable Anodes (DSA), and lead dioxide. Other materials may also be used for the electrode. The first anode allows the desired reaction to take place. In this anolyte compartment of the cell, the oxidation (desulfoxylation) reaction and subsequent radical-radical coupling takes place. In one embodiment, the anodic desulfoxylation/oxidative coupling of sulfonic acids occurs via a reaction that is similar to the known "Kolbe reaction." The standard Kolbe reaction is a free radical reaction and is shown below:

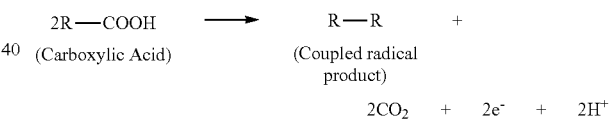

This Kolbe reaction is typically conducted in non-aqueous methanolic solutions, with partially neutralized acid (in the form of alkali salt) used with a parallel plate type electrochemical cell. The anolyte used in the cell may have a high density.

As can be seen from the Kolbe reaction, the "R" groups of two carboxylic acid molecules are coupled together, thereby resulting in a coupled radical product. In one embodiment, the Kolbe reaction is a free radical reaction in which two "R radicals" (R.) are formed and are subsequently combined together to form a carbon-carbon bond. It will be appreciated by those of skill in the art, that depending upon the starting material used, the coupled radical product may be a hydrocarbon or some other chain. The coupled radical product may be a dimer, or a mixed product comprising one or more high- or low-carbon containing material. The radical in the coupled radical product may include an alkyl-based radical, a hydrogen-based radical, an oxygen-based radical, a nitrogen-based radical, other hydrocarbon radicals, and combinations thereof. Thus, although hydrocarbons are shown in the examples below as the coupled radical product, the hydrocarbon may be freely substituted for some other appropriate coupled radical product.

As noted above, however, the present embodiments may use a sodium salt (or alkali metal salt) of the sulfonic acid in the anolyte rather than the carboxylic acid itself. Thus, rather than using the standard Kolbe reaction (which uses a carboxylic acid in the form of a fatty acid), the present embodiments may involve conducting the following reaction at the anode:

(Sodium salt of alkyl sulfonate) (coupled radical product)

Again, this embodiment results in two "R" groups being coupled together to form a coupled radical product such as a hydrocarbon. There are distinct advantages of using the sodium salt of the sulfonic acid instead of the sulfonic acid itself:

- $([R-SO_3]^-Na^+)$ is more polar than $R-SO_3-H$ and so it is more likely to desulfonate (react) at lower voltages;
- The electrolyte conductivity may be higher for sodium salts of sulfonic acids than sulfonic acids themselves; and
- The anolyte and catholyte may be completely different allowing different reactions to take place at either electrode.

As noted above, the cell contains a membrane that comprises a sodium ion conductive membrane. This membrane selectively transfers sodium ions ($Na^+$) from the anolyte compartment to the catholyte compartment under the influence of an electrical potential, while at the same time preventing the anolyte and catholyte from mixing.

The catholyte may be aqueous NaOH or a non aqueous methanol/sodium methoxide solution. (The anolyte may be aqueous or non-aqueous). An electrochemically active cathode is housed in the catholyte compartment, where reduction reactions take place. These reduction reactions may be written as:

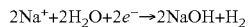

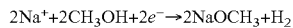

Hydrogen gas is the product of the reduction reaction at the cathode. NaOH (sodium hydroxide) or $NaOCH_3$ (sodium methoxide) is also produced. This NaOH or $NaOCH_3$ is the base that was used in a reaction to form $R-SO_3-Na$. Thus, this reaction may actually regenerate (in the catholyte compartment) one of the reactants needed in the overall process. This NaOH or $NaOCH_3$ may be recovered and re-used in further reactions. The ability to regenerate and re-use the NaOH or $NaOCH_3$ is advantageous and may significantly reduce the overall costs of the process.

In an alternative embodiment, a sodium salt of sulfonic acid with a small number of carbon atoms (such as $CH_3SO_3-Na$) may be added to the anolyte in addition to the $R-SO_3-Na$. The addition of this sulfonate may be advantageous in some embodiments because:

- It may act as a suitable supporting electrolyte as it is highly soluble in the solvent, thereby providing high electrolyte conductivity in the anolyte;
- It will itself desulfonate (in the electrolytic process) and produce $CH_3\cdot$ (methyl radicals) by the following reaction:

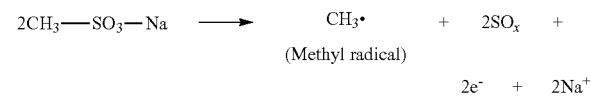
(Methyl radical)

In turn, the methyl radical may react with a hydrocarbon group of the sulfonic acid to form hydrocarbons with additional $CH_3-$ functional group:

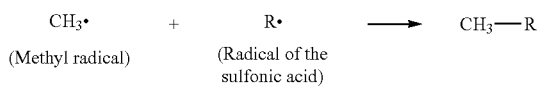
(Methyl radical) (Radical of the sulfonic acid)

Therefore, in one embodiment, by using $CH_3-SO_3-Na$ as part of the anolyte, this embodiment may couple two hydrocarbon radicals from the sulfonic acid together (R—R) or couple the radical of the sulfonic acid with a methyl radical from $CH_3-SO_3-Na$, thereby producing mixed hydrocarbon products. This mixture of products may be separated and used as desired. Of course, this embodiment is shown using $CH_3-SO_3-Na$ as the additional reactant. In the alternative, other sodium salts of a sulfonic acid with a small number of carbon atoms may also be used to couple a carbon radical to the radical of the sulfonic acid.

It will be appreciated that a variety of different hydrocarbons or coupled radical products may be formed using the present embodiments. For example, the particular "R" group that is selected may be chosen and/or tailored to produce a hydrocarbon that may be used for diesel, gasoline, waxes, JP8 ("jet propellant 8"), etc. The particular application of the hydrocarbon may depend upon the starting material chosen.

It should be noted that the above-recited embodiments which use a "desulfoxylation reaction" are similar to the "decarboxylation" reactions described in the following published patent applications:

U.S. Patent Application Publication No. 2011/0024288
U.S. Patent Application Publication No. 2011/0027848
U.S. Patent Application Publication No. 2011/0168569
U.S. Patent Application Publication No. 2013/0001095.

All of the above-recited published patent applications are expressly incorporated herein by reference. However, those skilled in the art will appreciate that the reactions, reaction conditions, reactants, etc. that are disclosed in the "decarboxylation" processes in the above-recited documents may be equally applied to the present "desulfoxylation" reactions. Further, the examples used herein focus on Na as the alkali metal. Those skilled in the art will appreciate that other alkali metals, or alloys of alkali metals, may be used in conjunction with or instead of Na.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
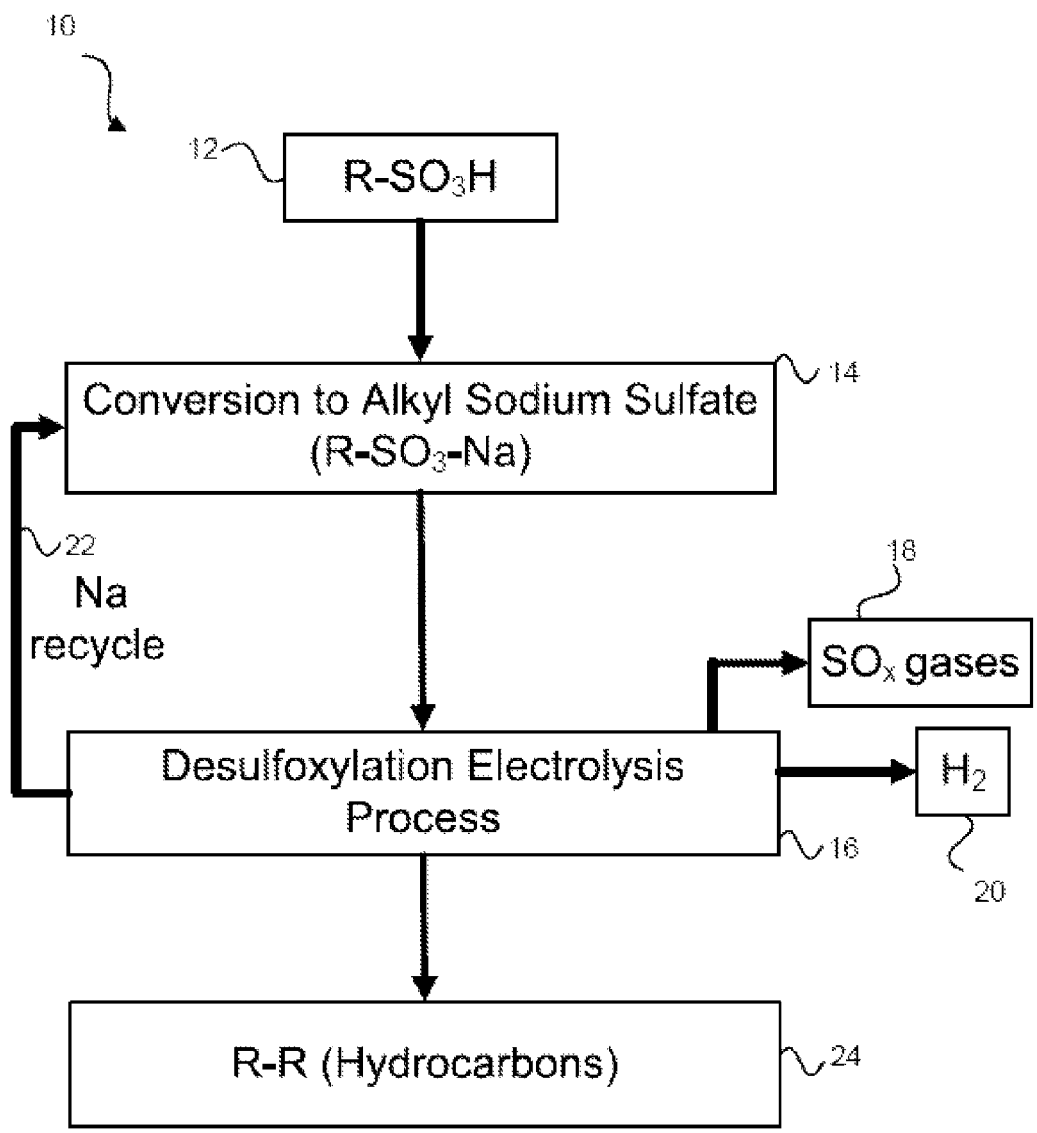
FIG. 1 is a schematic diagram illustrating the overall process that uses desulfoxylation to produce coupled hydrocarbon products.

Referring now to FIG. 1, the overall process 10 for producing a coupled radical product is disclosed. As shown in FIG. 1, a quantity of a sulfonic acid ($R-SO_3H$) may be obtained 12. This sulfonic acid may be an organic acid and may be obtained from biomass or from any other source. Those skilled in the art will appreciate the various different sources of sulfonic acids. Any and all sources of the sulfonic acid fall within the present embodiments. The above-recited published patent applications describe biomass as a potential starting material and that the biomass may be converted into sulfonic acids via known methods.

Once the sulfonic acid is obtained, the sulfonic acid may be converted 14 into the alkyl sodium sulfate ($R-SO_3-Na$). This conversion reaction may occur by reacting the sulfonic acid with a base, may occur in an electrochemical cell, or may occur in some other way. In other embodiments, instead of obtaining the sulfonic acid and reacting it to form the alkyl sodium sulfate, the quantity of the alkyl sodium sulfate may be directly obtained (through purchase, etc.).

The alkyl sodium sulfate may then be subjected to a desulfoxylation electrolysis process 16, in the manner outlined herein. As described herein, this process may produce a quantity of a $SO_x$ gas 18 (such as, for example, $SO_2$, $SO_3$, etc.). A quantity of hydrogen gas 20 may also be produced. Those skilled in the art will appreciate that these gases may be collected, re-used, disposed of, etc., as desired. Further, as part of the desulfoxylation process 16, the sodium ions may be recycled such as, for example, in the form of a base such as NaOH (as shown by arrow 22) and used again to form the $R-SO_3-Na$.

At the same time, the desulfoxylation process 16 operates to couple organic radicals together, thereby forming an R—R hydrocarbon product 24. As noted above, these hydrocarbons may be valuable products, such as fuels, gasoline additives etc.

Figure 2:
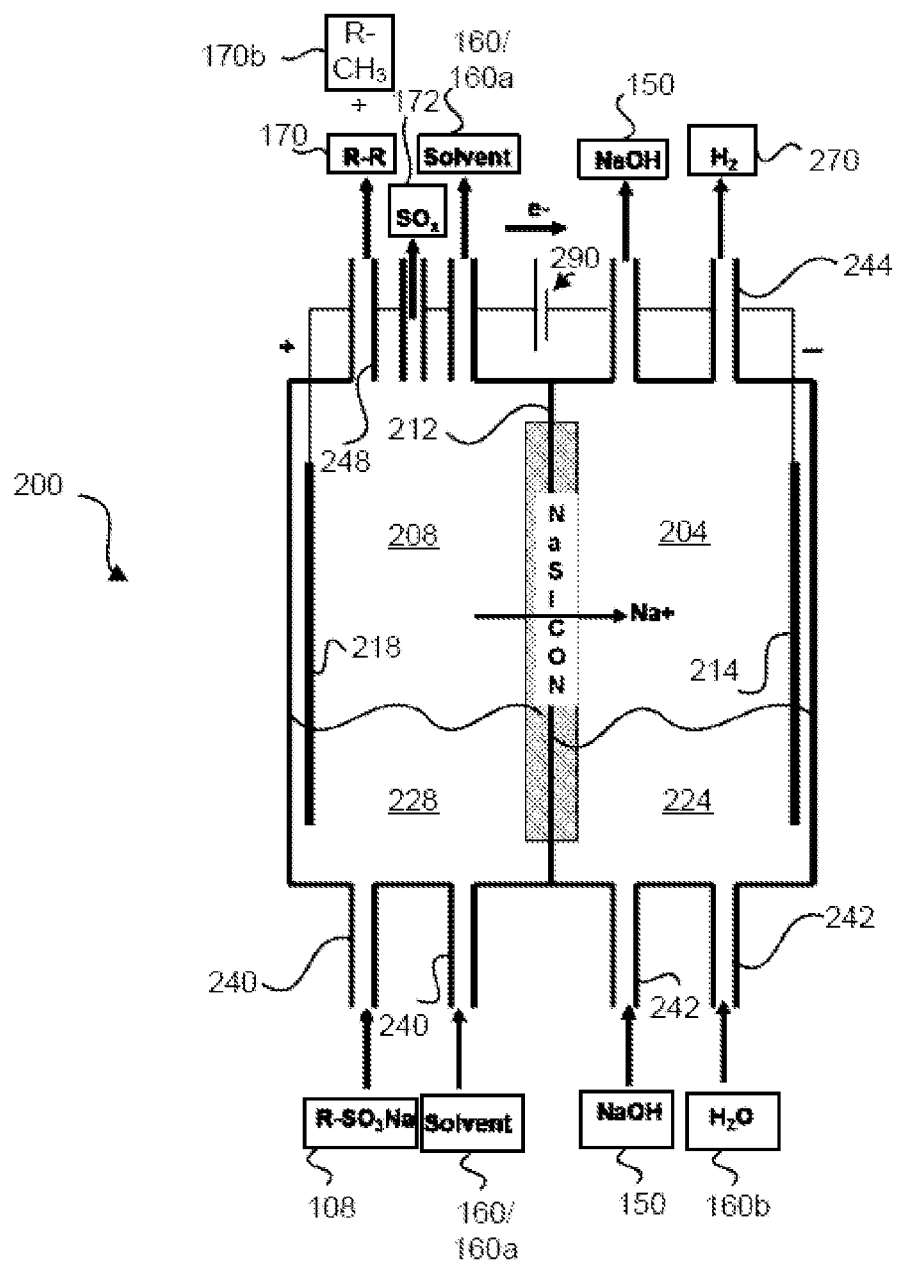
FIG. 2 is a schematic view of an electrolytic cell for conversion of sodium salts of sulfonic acids to coupled radical products by anodic desulfooxylation and subsequent carbon-carbon bond formation in accordance with the present embodiments.

An electrochemical cell may be used to conduct the desulfoxylation process 16. An example of a typical embodiment of a cell is shown in FIG. 2. This cell 200, which may also include a quantity of a first solvent 160 (which may be, for example, water or an alcohol like methanol, ethanol, and/or glycerol), may be used to conduct an advanced Kolbe reaction. The solvent 160 may be obtained from any source. This advanced Kolbe reaction produces a hydrocarbon 170 along with a quantity of $SO_x$ 172 gases. A quantity of a base 150 is also produced. (In the embodiment of FIG. 2, the base is NaOH.) The hydrocarbon 170 is but one example of any of a number of coupled radical products that may be produced by this process, and may be, for example, a mixture of hydrocarbons. Similarly, the $SO_x$ gases 172 produced in the process 200 is a naturally-occurring chemical and may be disposed of, collected, sold, etc.

The hydrocarbon 170 produced in the process 200 (and more specifically in the advanced Kolbe reaction) may be of significant value. Hydrocarbons have significant value for use in fuels, diesel fuels, gasoline, medical applications, waxes, perfumes, oils, and other applications and products. With the process of the present invention, different types of hydrocarbons may be used. Hydrocarbons are often classified by the number of carbons in their chain. In addition, hydrocarbons may often be classified into the following "fractions":

$C_1$ Methane fraction
$C_2$-$C_5$ Natural gas fraction
$C_6$-$C_{10}$ Gasoline fraction
$C_{10}$-$C_{13}$ JP8 fraction
$C_{14}$-$C_{20}$ Diesel fraction
$C_{20}$-$C_{25}$ Fuel Oil fraction
$C_{20}$-$C_{30}$ Waxes Note that these classifications are not exact and may change according to the particular embodiment. For example, the "gasoline fraction" could have a portion of $C_{11}$, the JP8 fraction could have some $C_{14}$, etc.

By forming the coupled radical products according to the present embodiments, various hydrocarbons could be made in some or all of these fractions. For example, embodiments may be constructed in which a $C_8$ hydrocarbon (octane) is formed, which is a principal ingredient in commercial gasoline. Likewise, a $C_{1-2}$ hydrocarbon may be formed, which may be used in making JP8. Of course, the exact product that is obtained depends upon the particular starting material(s) and/or the reaction conditions used. Thus, the present embodiments allow biomass to be converted into synthetic lubricants, gasoline, JP8, diesel fuels, or other hydrocarbons.

FIG. 2 shows the cell 200 (which may be an electrochemical cell to which a voltage may be applied). The cell 200 includes a catholyte compartment 204 and an anolyte compartment 208. The catholyte compartment 204 and the anolyte compartment 208 may be separated by a membrane 212.

The particulars of each cell 200 will depend upon the specific embodiment. For example, the cell 200 may be a standard parallel plate cell, where flat plate electrodes and/or flat plate membranes are used. In other embodiments, the cell 200 may be a tubular type cell, where tubular electrodes and/or tubular membranes are used. An electrochemically active first anode 218 is housed, at least partially or wholly, within the anolyte compartment 208. More than one anode 218 may also be used. The anode 218 may comprise, for example, a smooth platinum electrode, a stainless steel electrode, or a carbon based electrode. Examples of a typical carbon based electrode include boron doped diamond, glassy carbon, synthetic carbon, Dimensionally Stable Anodes (DSA) and relatives, and/or lead dioxide. Other electrodes may comprise metals and/or alloys of metals, including S·S, Kovar, Inconel/monel. Other electrodes may comprise $RuO_2-TiO_2/Ti$, $PtO_x-PtO_2/Ti$, $IrO_x$, $CO_3O_4$, $MnO_2$, $Ta_2O_5$ and other valve metal oxides. In addition, other materials may be used to construct the electrode such as $SnO_2$, $Bi_2Ru_2O_7$ (BRO), $BiSn_2O_7$, noble metals such as platinum, titanium, palladium, and platinum clad titanium, carbon materials such as glassy carbon, BDD, or Hard carbons. Additional embodiments may have $RuO_2-TiO_2$, hard vitrems carbon, and/or $PbO_2$. Again, the foregoing serve only as examples of the type of electrodes that may be employed. The cathode compartment 204 includes at least one cathode 214. The cathode 214 is partially or wholly housed within the cathode compartment 204. The material used to construct the cathode 214 may be the same as the material used to construct the anode 218. Other embodiments may be designed in which a different material is used to construct the anode 218 and the cathode 214.

The anolyte compartment 208 is designed to house a quantity of anolyte 228. The catholyte compartment 204 is designed to house a quantity of catholyte 224. In the embodiment of FIG. 2, the anolyte 228 and the catholyte 224 are both liquids, although solid particles and/or gaseous particles may also be included in either the anolyte 228, the catholyte 224, and/or both the anolyte 228 and the catholyte 224.

The anode compartment 208 and the cathode compartment 204 are separated by an alkali metal ion conductive membrane 212. The membrane utilizes a selective alkali metal transport membrane. For example, in the case of sodium, the membrane is a sodium ion conductive membrane 212. The sodium ion conductive solid electrolyte membrane 212 selectively transfers sodium ions ($Na^+$) from the anolyte compartment 208 to the catholyte compartment 204 under the influence of an electrical potential, while preventing the anolyte 228 and the catholyte 224 from mixing. Examples of such solid electrolyte membranes include those based on NaSICON structure, sodium conducting glasses, beta alumina and solid polymeric sodium ion conductors. NaSICON typically has a relatively high ionic conductivity at room temperature. Alternatively, if the alkali metal is lithium, then a particularly well suited material that may be used to construct an embodiment of the membrane is LiSICON. Alternatively, if the alkali metal is potassium, then a particularly well suited material that may be used to construct an embodiment of the membrane is KSICON.

The anolyte compartment 208 may include one or more inlets 240 through which the anolyte 228 may be added. Alternatively, the components that make up the anolyte 228 may be separately added to the anolyte compartment 208 via the inlets 240 and allowed to mix in the cell. The anolyte includes a quantity of the alkali metal salt of a sulfonic acid 108 (R—$SO_3$—Na). In the specific embodiment shown in FIG. 2, sodium is the alkali metal, so that alkali metal sulfonic acid salt 108 is a sodium salt. The anolyte 228 also includes a first solvent 160, which, may be water 160a. Of course, other types of solvents may also be used. The anolyte 228 may optionally include other alkali metal salts of sulfonic acids (such as, for example, $CH_3$—$SO_3$—Na). Other mixtures of different alkali metal salts of sulfonic acids may also be used.

The catholyte compartment 204 may include one or more inlets 242 through which the catholyte 224 may be added. The catholyte 224 includes a second solvent 160b. The second solvent 160b may be water (as shown in FIG. 2) or may be alcohol or some other type of solvent of mixture of solvents. Significantly, the solvent 160b in the catholyte 224 is not necessarily the same as the first solvent 160a in the anolyte 228. In some embodiments, the solvents 160a, 160b may be the same. The reason for this is that the membrane 212 isolates the compartments 208, 204 from each other. Thus, the solvents 160a, 160b may be each separately selected for the reactions in each particular compartment (and/or to adjust the solubility of the chemicals in each particular compartment). Thus, the designer of the cell 200 may tailor the solvents 160a, 160b for the reaction occurring in the specific compartment, without having to worry about the solvents mixing and/or the reactions occurring in the other compartment. This may be a significant advantage in designing the cell 200. A typical Kolbe reaction only allows for one solvent used in both the anolyte and the catholyte. Accordingly, the use of two separate solvents may be advantageous. In other embodiments, either the first solvent 160a, the second solvent 160b, and/or the first and second solvents 160a, 160b may comprise a mixture of solvents.

The catholyte 224 may also include a base 150. In the embodiment of FIG. 2, the base 150 may be NaOH or sodium methoxide, or a mixture of these chemicals.

The reactions that occur at the anode 218 and cathode 214 will now be described. As with all electrochemical cells, such reactions may occur when voltage source 290 applies a voltage to the cell 200.

At the cathode 214, a reduction reaction takes place. This reaction uses the sodium ions and the solvent to form hydrogen gas 270 as well as an additional quantity of base 150. Using the chemicals of FIG. 2 as an example, the reduction reaction may be written as follows:

$$2Na^+ + 2H_2O + 2e^- \rightarrow 2NaOH + H_2$$

$$2Na^+ + 2CH_3OH + 2e^- \rightarrow 2NaOCH_3 + H_2$$

The hydrogen gas 270 and/or the base 150 may be extracted through outlets 244. The hydrogen gas 270 may be gathered for further processing for use in other reactions, and/or disposed of or sold. The production of the base 150 may be a significant advantage because the base 150 that was consumed in the conversion reaction 14 of FIG. 1 is regenerated in this portion of the cell 200. Thus, the base formed in the cell may be collected and re-used in future reactions (or other chemical processes). As the base may be re-used, the hassle and/or the fees associated with disposing of the base may be avoided.

The reactions that occur at the anode 218 may involve desulfoxylation. These reactions may involve an advanced Kolbe reaction (which is a free radical reaction) to form a quantity of a hydrocarbon 170 and carbon dioxide 172. Using the chemicals of FIG. 2 as an example, the oxidation reactions may be written as follows:

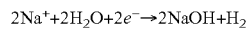
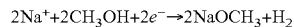

(Sodium salt of Sulfonic Acid)

(coupled radical product)

The $SO_x$ gas 172 may be vented off (via outlets 248). The coupled radical product 170 may also be collected via an outlet 248. For example, a quantity of the solvent 160/160a may be extracted via an outlet 248 and recycled, if desired, back to the inlet 240 for future use.

The advanced Kolbe reaction may comprise a free radical reaction. As such, the reaction produces (as an intermediate) a hydrocarbon radical designated as R. Accordingly, when two of these R. radicals are formed, these radicals may react together to form a carbon-carbon bond:

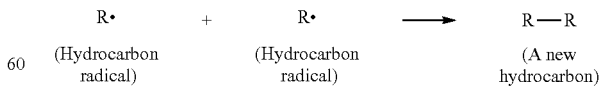

(Hydrocarbon radical)   (Hydrocarbon radical)   (A new hydrocarbon)

As shown in FIG. 2, this R—R hydrocarbon product is designated as hydrocarbon 170. In essence, the R moiety is being desulfoxylated, as the sulfonyl moeity is removed, leaving only the R. radical that is capable of reacting to form a hydrocarbon.

As noted above, additional salts of sulfonic acids may be used in FIG. 2. For example, if $CH_3$—$SO_3$—Na (or some other sodium salt of sulfonic acid with a small number of carbon atoms) may be part of (or added to) the anolyte 228. $CH_3$—$SO_3$—Na may act as a suitable supporting electrolyte as it is highly soluble in some solvents, providing high electrolyte conductivity. At the same time, $CH_3$—$SO_3$—Na may itself desulfoxylate as part of the advanced Kolbe reaction and produce $CH_3$. (methyl) radicals by the following reaction:

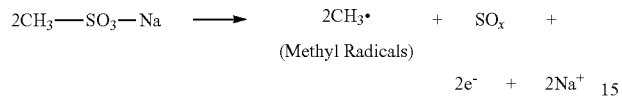
(Methyl Radicals)
$2e^-$ + $2Na^+$

The methyl radicals may then be reacted with hydrocarbon group of the sulfonic acid to form hydrocarbons with additional $CH_3$— functional group:

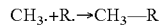

Alternatively or additionally, the methyl radical may react with another methyl radical to form ethane:

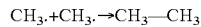

Ethane ($CH_3$—$CH_3$) is a hydrocarbon that may form a portion of the hydrocarbon product 170. The $CH_3$—R formed in the reaction may also be part of the hydrocarbon product 170. (This R—$CH_3$ product is shown as numeral 170b.) Thus, a mixture of hydrocarbons may be obtained, and are represented by the structure R—R. If desired, the various hydrocarbons may be separated from each other and/or purified, such as via gas chromatography or other known methods. The present embodiments may couple two hydrocarbon radicals or couple methyl radicals with hydrocarbon radicals. The amount of the $CH_3$—R or R—R in the product may depend upon the particular reaction conditions, quantities of reactants used in the anolyte, etc.

The foregoing example involved the use of $CH_3$—$SO_3$—Na in addition to the acid salt to produce reactive methyl radicals, thereby producing $CH_3$—R in addition to the R—R product. However, rather than $CH_3$—$SO_3$—Na, other salts that have a small number of carbons may be used in place of or in addition to $CH_3$—$SO_3$—Na. These salts having a small number of carbons may produce, for example, ethyl radicals, propyl radicals, isopropyl radicals, and butyl radicals during desulfoxylation. Materials that produce H radicals may also be used. Thus, by changing the optional component, additional hydrocarbons may be formed in the cell 200. The user may thus tailor the specific product formed by using a different reactant. Thus, it is possible to create a mixture of products as different alkyl radicals react together or even react with a methyl radical, a hydrogen radical, etc. The different alkyl radicals may be added by adding $CH_3$—$SO_3$—Na, H—$SO_3$—Na, etc. into the anolyte through, for example, an additional port in the anolyte compartment. Such a different mixture of products may be, in some embodiments, similar to what would occur in a disproportionation reaction.

In a similar manner, instead of and/or in addition to using $CH_3$—$SO_3$—Na, H—$SO_3$—Na may be used as part of the anolyte. During the electrochemical reaction, the H—$SO_3$—Na, like the $CH_3$—$SO_3$—Na, will undergo desulfoxylation to form a hydrogen radical:

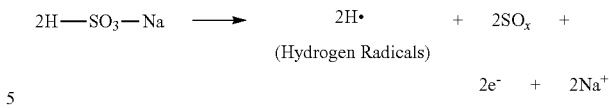
(Hydrogen Radicals)
$2e^-$ + $2Na^+$

In turn, this hydrogen radical will react to form:

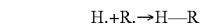

AND/OR

The use of H—$SO_3$—Na as an optional reactant may result in the R—R product being formed as well as a quantity of an R—H product (and even a quantity of hydrogen gas ($H_2$)). (The hydrogen gas may be re-used if desired). The use of H—$SO_3$—Na may prevent the unnecessary formation of ethane and/or may be used to tailor the reaction to from a specific hydrocarbon (R—H) product.

The particular R group that is shown in these reactions may be any "R" obtained from biomass, whether the R includes saturated, unsaturated, branched, or unbranched chains. When the R—R product is formed, this is essentially a "dimer" of the R group. For example, if the R group is $CH_3$, two methyl radicals react (2$CH_3$.) and "dimerize" into ethane ($CH_3$—$CH_3$). If the R group is a $C_{18}H_{34}$ hydrocarbon, then a $C_{36}H_{78}$ product may be formed. By using these simple principles, as well as using the H—$SO_3$—Na or the small chain salt, any desired hydrocarbon may be obtained. For example, by using a $C_4$ sodium salt, a $C_8$R—R hydrocarbon may be formed, which may be useable as part of a gasoline. Likewise, if a $C_6$ sodium salt is used, a $C_{12}$R—R hydrocarbon may be formed, which may be useable as JP8. Synthetic lubricants, waxes, and/or other hydrocarbons may be formed in the same or a similar manner. Those skilled in the art will appreciate how to use these principals to create desired hydrocarbons.

Figure 3:
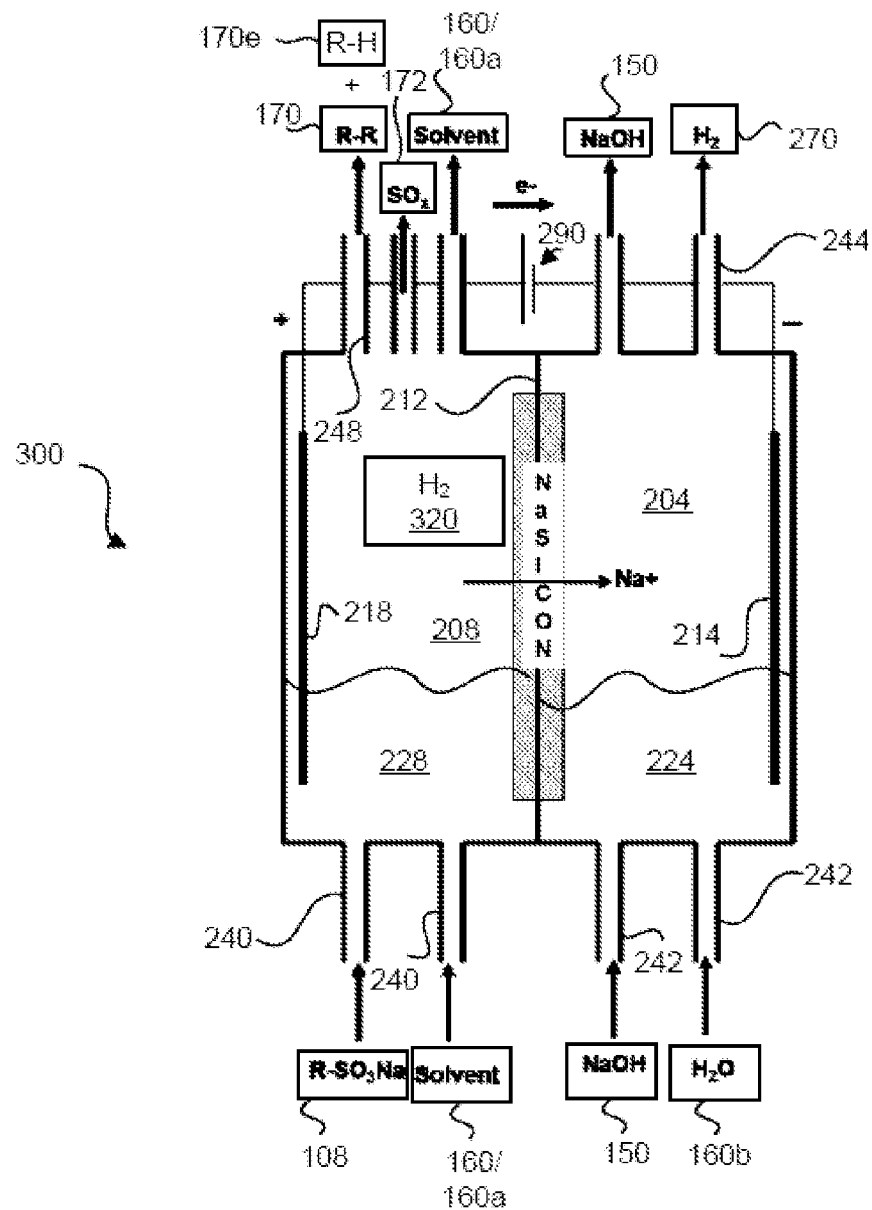
FIG. 3 is a schematic view of another embodiment of an electrolytic cell for conversion of sodium salts of sulfonic acids to coupled radical products.

An alternate embodiment to that of FIG. 2 will now be described with reference to the embodiment shown in FIG. 3. Because much of the embodiment of FIG. 3 is similar to that which is shown in FIG. 2, a discussion of portions of the similar features will be omitted for purposes of brevity, but is incorporated herein by this reference. Because the anolyte compartment 208 is separate from the catholyte compartment 204, it is possible to create a reaction environment in the anolyte compartment 208 that is different from the catholyte compartment 204. FIG. 3 illustrates this concept. For example, hydrogen gas ($H_2$) 320 may be introduced into the anolyte compartment 208. In some embodiments, the anolyte compartment 208 may be pressurized by hydrogen gas 320. In some embodiments, the anode 208 or anolyte could include a component 310 made of Pd or other noble metal (such as Rh, Ni, Pt, Ir, or Ru) or another substrate such as Si, a zeolite, etc. (This component may be all or part of the electrode and may be used to immobilize the hydrogen gas on the electrode.) Alternatively, Pd or Carbon with Pd could be suspended within the cell. The effect of having hydrogen gas in the anolyte compartment 208 is that the hydrogen gas may form hydrogen radicals (H.) during the reaction process that react in the manner noted above. These radicals would react with the R. radicals so that the resulting products would be R—H and R—R. If sufficient hydrogen radicals (H.) are present, the R—H product may be predominant, or may be the (nearly) exclusive product. This reaction could be summarized as follows (using Pd as an example of a noble metal, noting that any other noble metal could be used):

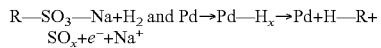

By using one or more of the noble metals with hydrogen gas in the anolyte compartment, the particular product (R—H) may be selected. In the embodiment of FIG. 3, hydrogen gas 270 is produced in the catholyte compartment 204 as part of the reduction reaction. This hydrogen gas 270 may be collected and used as the hydrogen gas 320 that is reacted with the noble metal in the anolyte compartment 208. Thus, the cell 300 actually may produce its own hydrogen gas 270 supply that will be used in the reaction. Alternatively, the hydrogen gas 270 that is collected may be used for further processing of the hydrocarbon, such as cracking and/or isomerizing waxes and/or diesel fuel. Other processing using hydrogen gas may also be used. The R—H product (which is designated as 170e) helps to minimize the formation of the R—R group (which, if the R group is sufficiently, large, may be a hydrocarbon such as a wax).

Figure 4:
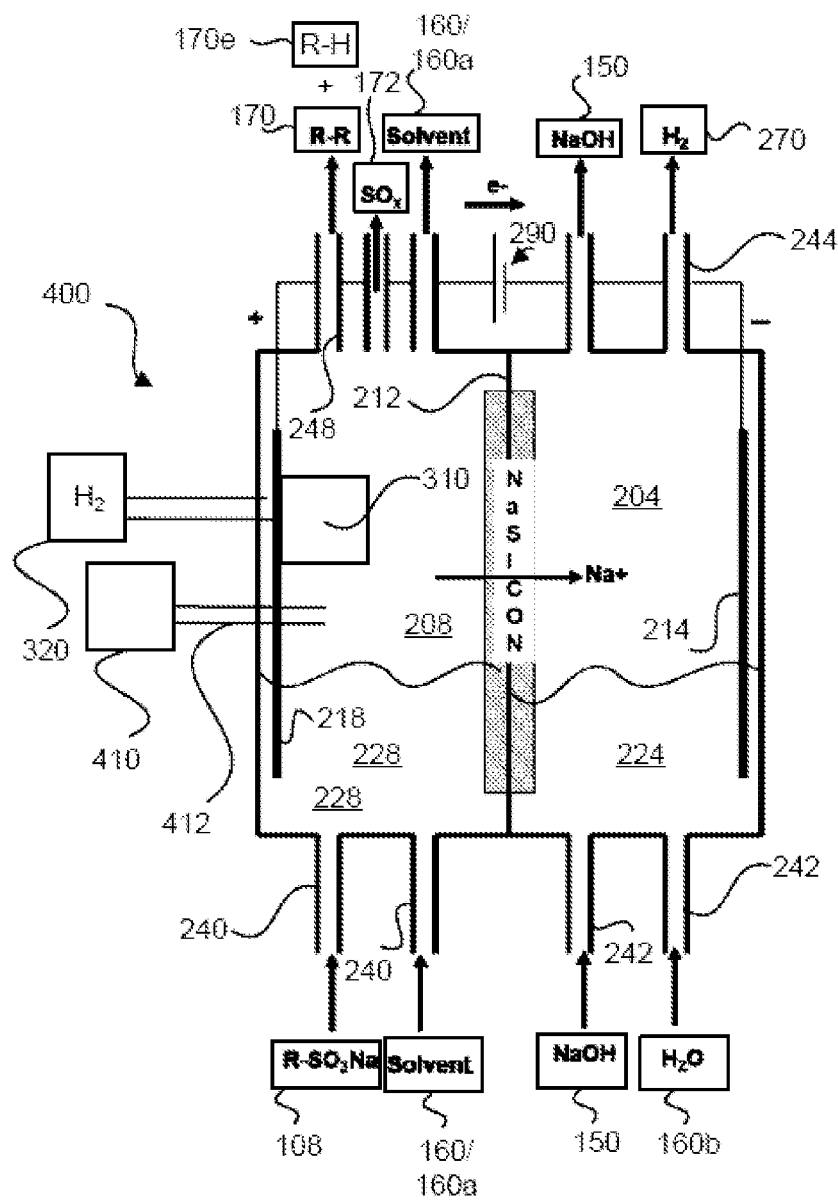
FIG. 4 is a schematic view of another embodiment of an electrolytic cell for conversion of sodium salts of sulfonic acids to coupled radical products.

Referring now to FIG. 4, an additional embodiment of a cell 400 is illustrated. The cell 400 is similar to the cells that have been previously described. Accordingly, for purposes of brevity, much of this discussion will not be repeated. In the embodiment of FIG. 4, the cell 400 is designed such that one or more photolysis reactions may occur in the anolyte compartment 208. Specifically, a photolysis device 410 is designed such that it may emit (irradiate) radiation 412 into the anolyte compartment 208. This irradiation may produce hydrogen radicals (H.). The hydrogen gas 320 may be supplied to the anolyte compartment 208 using any of the mechanisms described above, as illustrated by the following equation:

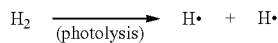

This photolysis process may be combined with the electrolysis process of the cell described above:

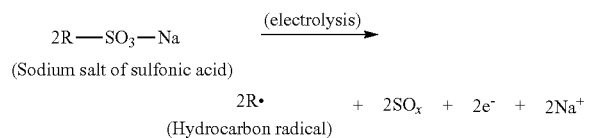

The hydrogen radicals and the hydrocarbon radicals may then combine to form a mixture of products:

2H.+2R.→H—R+R—R+H$_2$

Alternatively, the photolysis device may be used to conduct desulfoxylation and to generate hydrocarbon radicals:

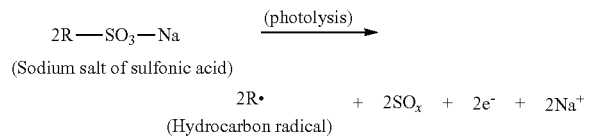

Thus, a combination of photolysis and electrolysis may be used to form the hydrocarbon radicals and/or hydrogen radicals in the anolyte compartment 208:

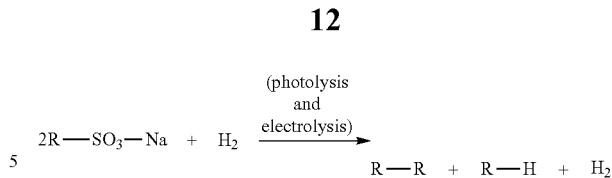

This combination of electrolysis and photolysis may speed up the rate of the desulfoxylation reaction.

Yet additional embodiments may be designed using such photolysis techniques. For example, the following reactions may occur:

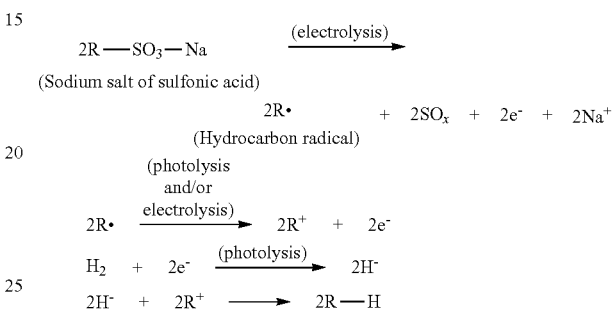

This combination of reactions (using photolysis and electrolysis) forms carbocations and H$^-$ anions that may combine to form the hydrocarbon. Thus, photolysis may be used as a further mechanism for forming hydrocarbons. As has been discussed above, although hydrocarbons are being used in these examples, the coupled radical product need not be a hydrocarbon. In certain embodiments, the method and apparatus of the present invention may be used to create nonhydrocarbon radicals which may couple together to form useful coupled radical products.

Referring now to FIGS. 2-4 collectively, it is noted that each of these illustrative embodiments involve separation of the anolyte compartment 208 and the catholyte compartment 204 using the membrane 212. As described herein, specific advantages may be obtained by having such a membrane 212 to separate the anolyte compartment 208 from the catholyte compartment 204. These advantages include:

- two separate environments for different reaction conditions—for example, the anolyte may be non-aqueous, while the catholyte is aqueous (and vice versa);
- anolyte may be at a higher temperature than the catholyte (and vice versa);
- anolyte may be pressurized and catholyte not (and vice versa);
- anolyte may be irradiated and catholyte not (and vice versa);
- anolyte and/or anode may be designed to conduct specific reactions that are not dependent upon the catholyte and/or cathode reactions (and vice versa);
- the different chambers may have different flow conditions, solvents, solubilities, product retrieval/separation mechanisms, polarities, etc.

The ability to have separate reaction conditions in the anolyte compartment and catholyte compartment may allow the reactions in each compartment to be tailored to achieve optimal results.

Likewise, a membrane, comprising, for example, NaSICON, has a high temperature tolerance and thus the anolyte may be heated to a higher temperature without substantially affecting the temperature of the catholyte (or vice versa). (NaSICON can be heated and still function effectively at higher temperatures). This means that polar solvents (or non-polar solvents) that dissolve sulfonic acids and sodium salts at high temperatures may be used in the anolyte. At the same time, the catholyte is unaffected by temperature. In fact, a different solvent system could simultaneously be used in the catholyte. Alternatively, other molten salts or acids may be used to dissolve ionic sodium acids and salts in the anolyte. Long chain hydrocarbons, ethers, triglycerides, esters, alcohols, or other solvents may dissolve acids and sodium salts. Such compounds could be used as the anolyte solvent without affecting the catholyte. Ionic liquids could be used as the anolyte solvent. These materials not only would dissolve large quantities of sulfonic acid sodium salts, but also, may operate to facilitate the desulfoxylation reaction at higher temperatures. Ionic liquids are a class of chemicals with very low vapor pressure and excellent dissolving abilities/dissolving properties. A variety of different ionic liquids may be used.

As explained above, one of the advantages of the present cell is that it produces a base 150 in the catholyte compartment 204. As noted above, this base 150 may then be used as part of the reaction 14 that produces the sodium salt of the sulfonic acid. The Na$^+$ ions for this reaction come from the anolyte 228 through the membrane. Alternatively, embodiments may be made in which the sulfonic acids may be reacted to form alkali metal salts directly in the catholyte compartment 208. In other words, the conversion reaction 14 occurs within the cell itself to produce the sulfonic acid sodium salt, and this sodium salt is then taken from the catholyte compartment 204 to the anolyte compartment 208 (such as via a conduit). This process thus allows the sulfonic acid to be converted to the alkali metal salt in situ (e.g., within the cell). This process would be a one step process (e.g., simply running the cell) rather than a two step process (conversion reaction and desulfoxylation within the cell).

It should be noted that the above-recited embodiments operate to produce SO$_x$ gases as a result of the desulfoxylation reaction. By methods known in the art, these SO$_x$ gases may be converted into SO$_3$ gas. In turn, this SO$_3$ gas may be reacted (in a known manner) with water to form sulfuric acid (H$_2$SO$_4$), which is a valuable and useful chemical that may be used, sold, etc.

$$SO_3+H_2O \rightarrow H_2SO_4$$

embodiments may be designed in which the R—SO$_3$—Na reacts in water in the following manner:

$$H_2O \rightarrow 2H^+ + \tfrac{1}{2}O_2 + 2e^-$$

R—SO$_3$—Na Please replace paragraph[0051] with the following:
Additional+H$^+$→R—SO$_3$—H+Na$^+$

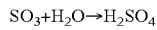

$$2R\text{—}SO_3\text{—}H \rightarrow 2R\cdot + 2SO_x + 2e^- +$$

In other words, the above-recited embodiments have the water react first, thereby producing the acid (R—SO$_3$—H) and then this acid product undergoes desulfoxylation. Those skilled in the art will appreciate how to control the various conditions in order to desulfoxylate the acid (R—SO$_3$—H) or the sodium salt acid (R—SO$_3$—Na), as desired.

In one embodiment, the anolyte comprises G-type solvents, H-Type solvents, and/or mixtures thereof. G-type solvents are di-hydroxyl compounds. In one embodiment the G-type compound comprises two hydroxyl groups in contiguous position. H-type solvents are hydrocarbon compounds or solvent which can dissolve hydrocarbons. For example, H-type solvents include, hydrocarbons, chlorinated hydrocarbons, alcohols, ketones, mono alcohols, and petroleum fractions such as hexane, gasoline, kerosene, dodecane, tetrolene, and the like. The H-type solvent can also be a product of the desulfoxylation process recycled as a fraction of the hydrocarbon product. This will obviate the need of procuring additional solvents and hence improve overall economics of the process.

By way of further description, G-type of solvents solvate an —SO$_3$—Na group of a alkali metal salt of acid by hydrogen bonding with two different oxygen atoms, whereas the hydrocarbon end of the alkali metal salt of sulfonic acid is solvated by an H-type of solvent. For a given G-type solvent, the solvency increases with increase of hydrocarbons in the H-type solvent.

The table below shows some non-limiting examples of G-type and H-type solvents:

| G-type | H-type |
|---|---|
| ethylene glycol | isopropanol |
| glycerine | methanol |
| 1,2-dihidroxy-4-oxadodecane | ethanol |
| 2-methyl-2-propyl-1,3-propanediol | butanol |
| 2-ethyl-1,3-hexanediol | amyl alcohol |
| 2-amino-2-methyl-1,3-propanediol | octanol |
| 2,3-butanediol | hexane |
| 3-amino-1,2-propanediol | trichloroethane, dichloroethane |
| 1,2-octanediol | methylene dichloride |
| cis-1,2-cyclohexanediol | chloroform |
| trans-1,2-cyclohexanediol | carbon tetrachloride |
| cis-1,2-cyclopentanediol | tetralin |
| 1,2-pentanediol | decalin |
| 1,2-hexanediol | monoglyme |
| | diglyme |
| | tetraglyme |
| | acetone |
| | acetaldehyde |

It should be noted that although there are specific advantages of using a divided cell, embodiments may be constructed in which the cell is undivided. This cell may be summarized as follows:

Pt∥R—SO$_3$—Na+NaOH+H$_2$O∥Pt

The Pt electrodes may be replaced by other electrodes, as outline herein. Also, the base NaOH may be replaced by other bases (such as sodium methylate, or other bases), as desired. Likewise, the solvent, water, may be replaced by other solvents, as desired. In this embodiment, the anode reaction is a desulfoxylation reaction to form SO$_x$ and R—R. The cathode reaction is a reduction to form hydrogen gas (the H being provided by the water). In other embodiments, CH$_3$—SO$_3$—Na (or other R groups) may optionally be used. Similarly, the acidic form of the sodium salt may be used, provided that there is also base to convert it to a sodium salt.

Although many of the examples provided herein involve the use of monosulfonic acids, disulfonic acids or polysulfonic acids may also be used. However, when using disulfonic acids or polysulfonic acids, steps (in some embodiments) may be taken to avoid or reduce polymerization. This polymerization reaction is summarized below by a disulfonic acid, but a similar reaction is possible for a polysulfonic acid:

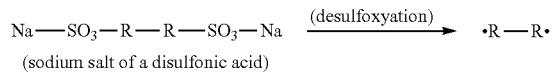

Na—SO$_3$—R—R—SO$_3$—Na $\xrightarrow{\text{(desulfoxyation)}}$ ·R—R·

(sodium salt of a disulfonic acid)

Since these hydrocarbon radicals have reactive sites at each end, these .R—R. radicals could then line up to polymerize:

...R—R.+.R—R.R—R.+.R—R....

In some embodiments, such polymerization may be desired. In other embodiments, polymerization is not desired. Accordingly, techniques may be employed to reduce the likelihood of polymerization (e.g., "cut off" the polymerization). This may involve, for example, forming methyl radicals ($CH_3$.) via acetate, forming H. radicals to truncate the R group. Likewise, the techniques associated with using a mixed solvent system may also reduce such polymerization. For example, by using a nonpolar solvent in combination with a polar solvent in the anolyte, the formed hydrocarbon will be pulled into the non-polar solvent quickly, thereby preventing it from polymerizing.

Various examples of the techniques described herein may be used and performed readily. Some of these examples include:

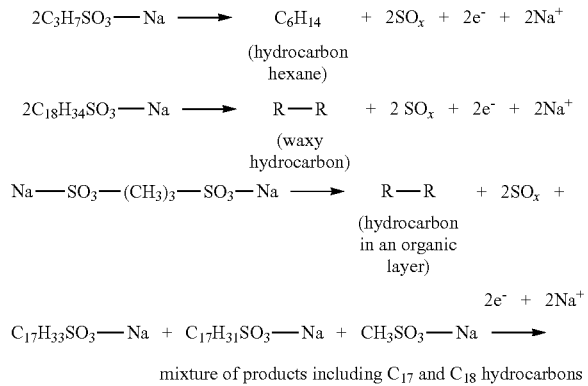

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for producing a coupled radical product comprising:
   obtaining a sodium salt of an alkyl sulfonic acid;
   preparing an anolyte for use in an electrolytic cell, the electrolytic cell comprising an anolyte compartment, a catholyte compartment, and a NaSICON membrane that separates the anolyte compartment from the catholyte compartment, wherein the anolyte is housed within the anolyte compartment and a catholyte is housed within the catholyte compartment, wherein the anolyte comprises a first solvent or mixture of solvents and a quantity of the sodium salt of the alkyl sulfonic acid; and
   electrolyzing the anolyte within the cell to desulfoxylate the sodium salt of the alkyl sulfonic acid to convert the sodium salt of the alkyl sulfonic acid into one or more alkyl radicals that react to form a coupled radical product.

2. A method as in claim 1, wherein the sodium salt of the alkyl sulfonic acid is derived from biomass.

3. A method as in claim 2, wherein the coupled radical product comprises a hydrocarbon.

4. The method of claim 1, wherein the sodium salt of the alkyl sulfonic acid comprises $CH_3$—$SO_3$—Na.

5. The method of claim 4, wherein electrolyzing the anolyte within the cell to desulfoxylate the sodium salt of the alkyl sulfonic acid comprises desulfoxylating the $CH_3$—$SO_3$—Na to convert the $CH_3$—$SO_3$—Na into the one or more alkyl radicals that react to form the coupled radical product.

6. The method of claim 5, wherein the alkyl radicals comprise methyl radicals.

7. The method of claim 1, wherein the anolyte further comprises H—$SO_3$—Na.

8. The method of claim 7, wherein electrolyzing the anolyte further comprises desulfoxylating the H—$SO_3$—Na to convert the H—$SO_3$—Na into one or more hydrogen radicals that react to form a coupled radical product.

9. The method as in claim 1, further comprising feeding hydrogen gas into the anolyte compartment and photolysing the hydrogen gas to form one or more hydrogen radicals.

* * * * *